US011902896B2

(12) United States Patent
Al-Haboubi

(10) Patent No.: US 11,902,896 B2
(45) Date of Patent: Feb. 13, 2024

(54) METHOD AND A SYSTEM FOR MANAGING A SLEEP-MODE OF AN ELECTRONIC DEVICE

(71) Applicant: Morse Micro Pty. LTD., Surry Hills (AU)

(72) Inventor: Harith Hamed Mohammed Al-Haboubi, Cambridge (GB)

(73) Assignee: Morse Micro Pty. LTD., Surry Hills (AU)

( * ) Notice: Subject to any disclaimer, the term of this patent is extended or adjusted under 35 U.S.C. 154(b) by 218 days.

(21) Appl. No.: 17/514,155

(22) Filed: Oct. 29, 2021

(65) Prior Publication Data
US 2022/0141768 A1    May 5, 2022

(30) Foreign Application Priority Data
Oct. 30, 2020   (AU) ................................. 2020903966

(51) Int. Cl.
*H04W 52/02*   (2009.01)

(52) U.S. Cl.
CPC ... *H04W 52/0216* (2013.01); *H04W 52/0219* (2013.01)

(58) Field of Classification Search
CPC ........................ H04W 52/0216; H04W 52/0219
See application file for complete search history.

(56) References Cited

U.S. PATENT DOCUMENTS

| | | | |
|---|---|---|---|
| 8,622,906 B2* | 1/2014 | Say .................. | G16H 20/17 422/50 |
| 11,180,158 B1* | 11/2021 | Lyle .................. | B60W 40/09 |
| 2005/0075148 A1* | 4/2005 | Park .................. | H04W 52/0216 455/574 |
| 2010/0039214 A1* | 2/2010 | Pratt .................. | H04W 52/0254 340/5.1 |
| 2010/0118698 A1* | 5/2010 | Yokobori ........... | H04W 74/085 370/328 |
| 2016/0212708 A1* | 7/2016 | Kim ................... | H04W 52/0229 |
| 2017/0339640 A1* | 11/2017 | Krishnamoorthy ........ | H04W 52/0225 |
| 2018/0041349 A1* | 2/2018 | Jung .................. | H04L 12/12 |
| 2018/0349655 A1* | 12/2018 | Tsuchida ........... | H04W 52/0225 |
| 2019/0015622 A1* | 1/2019 | Ewers ................ | A61B 5/4818 |
| 2019/0079465 A1* | 3/2019 | Ahmad ............... | G04G 13/021 |
| 2019/0247611 A1* | 8/2019 | Karp .................. | A47D 13/063 |
| 2019/0298255 A1* | 10/2019 | Dong .................. | A61B 5/369 |

(Continued)

*Primary Examiner* — Dominic E Rego
(74) *Attorney, Agent, or Firm* — CP LAW GROUP PC; Cy Bates

(57) ABSTRACT

The present disclosure provides a method for managing a sleep-mode of an electronic device that includes a processor, a memory and a communication interface configured to enable communication with a sleep-client device; the electronic device being arranged to enter the sleep-mode in predetermined circumstances to reduce power consumption; the method comprising the steps of: the electronic device modifying a value of a memory location associated with the communication interface; and the sleep-client device, reading a value of the memory location associated with the communication interface prior to transmitting data to the electronic device via the communication interface; wherein the memory location is representative of the availability of the electronic device to receive data via the communication interface.

11 Claims, 5 Drawing Sheets

(56) References Cited

U.S. PATENT DOCUMENTS

| | | | |
|---|---|---|---|
| 2020/0054289 A1* | 2/2020 | Shimol | A61B 5/7253 |
| 2020/0100269 A1* | 3/2020 | Gulbay | G06F 1/3212 |
| 2020/0125036 A1* | 4/2020 | Weiss | G08B 25/10 |
| 2020/0345533 A1* | 11/2020 | Bollella | A61H 23/00 |
| 2020/0384239 A1* | 12/2020 | Fornell | H04B 5/0037 |
| 2021/0007049 A1* | 1/2021 | Catovic | H04W 52/0274 |
| 2022/0014041 A1* | 1/2022 | Knode | H04W 72/20 |

* cited by examiner

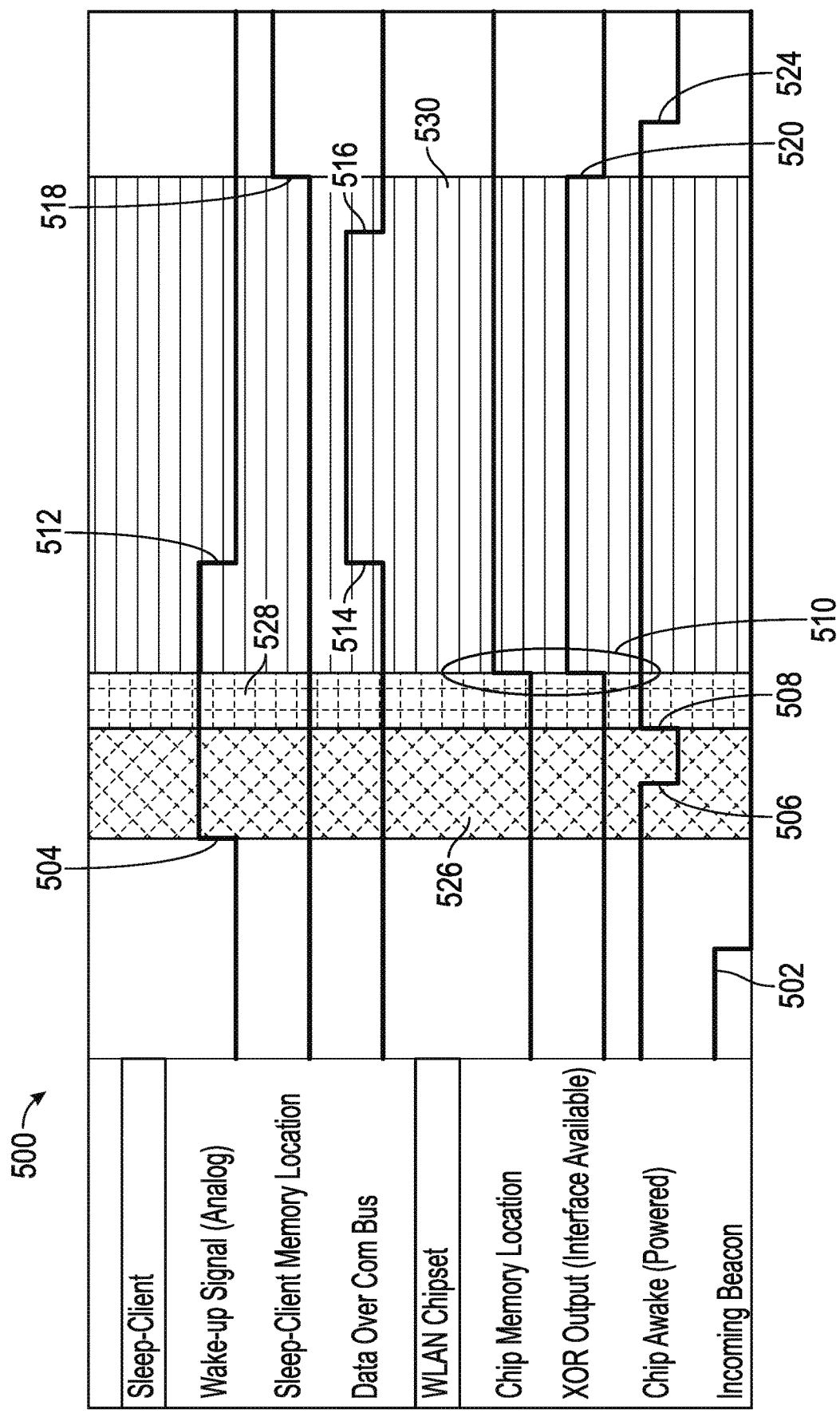

METHOD AND A SYSTEM FOR MANAGING A SLEEP-MODE OF AN ELECTRONIC DEVICE

FIELD OF THE INVENTION

The disclosure relates to a method for managing the sleep-mode of an electronic communication device and a system that implements such method, in particular the disclosure relates to management of the sleep-mode of a wireless communication device.

BACKGROUND

In a wireless enabled device, the communication between resources on the device and the wireless chip is generally asynchronous. Such communication is usually managed by the on-board host processor through a software driver and a chip interface of the wireless chip.

In order to save energy, the wireless chip spends as much time as possible in a low-power consumption mode, sleep-mode. The wireless chip wakes-up periodically to sense the wireless medium (WM) and, potentially communicate, with other wireless devices, for example the chip may wake-up to listen for beacons sent by an access point (AP) on a IEEE 802.11 WiFi network.

The wireless chip is generally not able to receive information from other processors when in a sleep mode. In some instances, sleep-clients may be able to send a wake-up signal through a hardware signal line to the wireless chip to request wake-up. However, when such wake-up is requested through the wake-up signal, the wireless chip may be in the process of waking-up or committed to going into a sleep-mode while the wake-up signal is still active.

The asynchronicity between the requirement for the interface from sleep-clients and the chip host and the actual availability of the interface to receive data may result in loss of information and reduced efficiency and may compromise the operation of the entire system.

Generally, the wireless chip being powered and awake is not a sufficient condition to guarantee the host interface is available.

SUMMARY OF THE INVENTION

In accordance with the first aspect, the present invention provides a method for managing a sleep-mode of an electronic device that comprises a processor, a memory and a communication interface configured to enable communication with a sleep-client device; the electronic device being arranged to enter the sleep-mode in predetermined circumstances to reduce power consumption; the method comprising the steps of:
  the electronic device modifying a value of a memory location associated with the communication interface; and
  the sleep-client device, reading a value of the memory location associated with the communication interface prior to transmitting data to the electronic device via the communication interface;
  wherein the memory location is representative of the availability of the electronic device to receive data via the communication interface.

In an embodiment, the method further comprises the step of the sleep-client device setting the value of the memory location to a preset value to indicate that the communication interface is no longer required.

In an embodiment, the step of modifying the value of a memory location associated with the communication interface is performed to advertise availability of the communication interface.

In an embodiment, the method further comprises the step of sending an interrupt signal to the electronic device or to the sleep-client device upon a change of the value of the memory location.

In an embodiment, the method further comprises the step of the sleep-client device sending a wake request signal to request availability of the communication interface.

In accordance with the second aspect, the present invention provides a wireless communication device comprising:
  a RF radio module arranged to receive and transmit radio frequency signals;
  an analog-to-digital (ADC) converter and digital filters;
  a processor;
  a communication interface configured to enable communication with a sleep-client device;
  a memory location associated with the communication interface;
  an interrupt module operatively coupled to the processor;
  wherein the memory location is representative of the availability of the electronic device to receive data via the communication interface.

In embodiments, the device further comprises a wake pin arranged to receive a wake request signal from a sleep-client, the wake request signal representing a request to the wireless chip to wake-up.

In an embodiment, the memory location is accessible by the sleep-client device even when the electronic device is not available to receive data through the communication interface.

In accordance with the third aspect, the present invention provides a method for managing a sleep-mode of an electronic device that comprises a processor, a memory and a communication interface configured to enable communication with a sleep-client device; the electronic device being arranged to enter the sleep-mode in predetermined circumstances to reduce power consumption; the method comprising the steps of:
  the electronic device modifying a value of a first location of the memory to advertise availability of the communication interface; and
  the sleep-client device, modifying a value of a second location of the memory based on a requirement of the communication interface from the sleep-client device;
  wherein the availability of the electronic device to receive data via the communication interface is encoded in a combination of the values at the first and second memory locations.

In an embodiment, the method further comprises the step of sending an interrupt signal to the electronic device upon writing of the second memory location or sending an interrupt signal to a sleep-client device upon writing of the first memory location.

In an embodiment, the first and second memory locations are memory bits, and the combination of the locations is an XOR logic operation.

In an embodiment, the method further comprises the step of the sleep-client device sending a wake request signal to request availability of the communication interface.

In an embodiment, upon confirmation of availability of the communication interface, the sleep-client sends a minimum clocking requirement request to the electronic device.

In accordance with the fourth aspect, the present invention provides a wireless communication device comprising:

a RF radio module arranged to receive and transmit radio frequency signals;
an analog-to-digital (ADC) converter and digital filters;
a processor; and
a communication interface configured to enable communication with a sleep-client device;
a first and a second memory locations associated with the communication interface; the first memory location being accessible from the electronic device and the second memory location being accessible by the sleep-client device;
an interrupt module operatively coupled with the processor and the sleep client device;
wherein the availability of the electronic device to receive data via the communication interface is encoded in a combination of the values at the first and second memory locations.

In an embodiment, the device further comprises a wake pin arranged to receive an analog wake-up signal from a sleep-client, the wake-up signal representing a request from the to the wireless chip to wake-up.

In an embodiment, the second memory location is accessible by the sleep-client device even when the electronic device is not available to receive data through the communication interface.

In accordance with the fifth aspect, the present invention provides a communication system comprising a wireless communication device in accordance with the fourth aspect and a host device which operates as a sleep-client of the wireless communication device.

Advantages of embodiments of the invention include the provision of a system to allow the WLAN chip to advertise the availability of its communication interface to sleep-clients. Sleep-clients, on the other hand, can communicate, using memory locations, when the interface to the WLAN chip is no longer required.

Although the invention has been described in terms of devices and methods for managing a sleep mode between a WLAN chipset and one or more sleep-clients, the methodologies and processes described can find application in other wireless or wired communication technologies.

BRIEF DESCRIPTION OF THE DRAWINGS

For proper understanding of the invention, reference should be made to the accompanying drawings, wherein:

FIG. 5 schematically shows a timeline of tasks that take place when the WLAN chip and the sleep-client use a sleep management methodology in accordance with embodiments.

DETAILED DESCRIPTION OF THE INVENTION

For purposes herein, the term "WLAN", or wireless LAN, means a wireless computer network that links tow or more devices using wireless communication to form a local area network (LAN) within a limited area.

The term "Physical (PHY) processor" means processing hardware capable of implementing functions of the PHY layer of the IEEE802.11 standard to interface with the wireless medium.

The term "Media Access Control (MAC) processor" means processing hardware capable of implementing functions of the MAC layer of the IEEE802.11 standard.

The term "PHY Protocol Data Unit (PPDU)" means basic unit of information transmitted over the network at the PHY level.

The term "wireless receiving station (STA)" means a networking device capable of communicating with an access point over a wireless network.

The term "access point (AP)" means a networking device capable of communicating with several client devices (stations) over a wireless network and capable to interface with a wired network. For example, an 802.11 Wi-Fi access point.

The term "sleep-clients" means devices that share the platform with the WLAN device that require access to the WLAN device to perform their functions. For example, these devices may need to send data over the wireless medium.

The term "memory banks" means any form of digital memory for storing digital information.

The term "input and output interfaces" means hardware or software data exchange means for transferring data to and from electronic devices. For example, digital data exchange or diagnostic serial buses, such as GPIO bus or USB.

Figure 1:
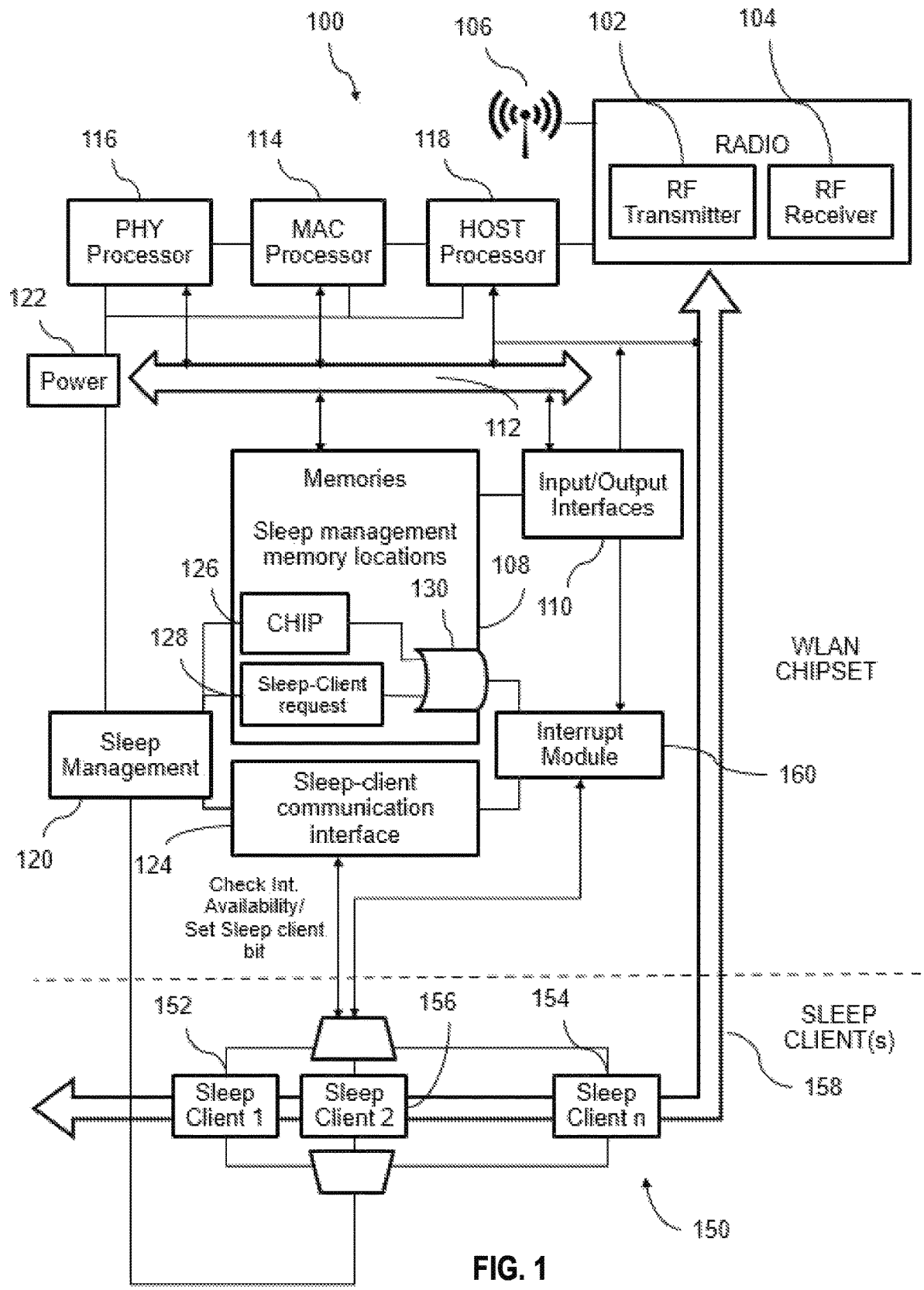
FIG. 1 shows a block diagram of a WLAN device that communicates with a number of sleep clients in accordance with embodiments.

Referring now to FIG. 1, there is shown a block diagram of a WLAN device 100 that communicates with a number of sleep-clients 150.

WLAN device 100 includes a radio frequency (RF) transmitter module 102, an RF receiver module 104, an antenna unit 106, one or more memory banks 108, input and output interfaces 110 and communication bus 112. Furthermore, the device 100 includes a MAC processor 114, a PHY processor 116 and a HOST processor 118. These processors can be any type of integrated circuit (IC) including a general processing unit, an application specific integrated circuit (ASIC) or RISC-V based ICs, amongst others.

The memory 108 stores software including at least some functions of the MAC layer. Each processor executes software to implement the functions of the respective communication/application layer.

The PHY processor 116, in particular, includes a transmitting signal processing unit and a receiving signal processing unit and manages the interface with the WM. The PHY processor 116 operates on PPDUs by exchanging digital samples with the radio module which comprises the RF transmitter 102, the RF receiver 104, analog-to-digital converters and digital filters.

The MAC processor 114 executes MAC level instructions and manages the interface between the STA application software and the WM, through the PHY processor 116. The MAC processor 114 is responsible for coordinating access to the WM so that the Access Point (AP) and STAs in range can communicate effectively. The MAC processor adds header and tail bytes to units of data provided by the higher levels in the STA and sends them to the PHY layer for transmission. The reverse happens when receiving data from the PHY layer. If a frame is received in error, the MAC processor manages the retransmission of the frame.

The HOST processor 118 interfaces with the MAC layer and is responsible for running higher level functionalities of the STA.

The PHY processor 116, the MAC processor 114, the HOST processor 118, the sleep management module 120, memories 108 and input/output interfaces 110, communicate with each other via the bus 112. The memory 108 may further store an operating system and applications. In some embodiments, the memory may store recorded information about captured frames and packets. The input/output interface unit 110 allows for exchange of information with a user of the STA.

The antenna unit 106 can include a single antenna or multiple antennas to implement Multiple Input Multiple Output (MIMO) techniques.

The sleep management module 120 is configured to manage hardware resources to operate the WLAN device 100 in low-power mode (sleep-mode) and wake-up the device when necessary. It is crucial for some WLAN devices, for example battery operated WLAN devices, to avoid using too much power and use the sleep-mode as often as possible. Wake-up requests can be received from remote devices, such as an AP, implemented locally based on the WiFi standard supported or received from sleep-clients located in the same apparatus as the WLAN device 100.

The sleep management module 120 is operatively connected to the power module 122 to manage powering up and down of electronic modules in the chipset. In some instances, the sleep management module comprises a hardware wake-up pin that the local sleep-clients 150 can connect to request wake-up of the WLAN device 100. Often the wake-up pin is an analogue connection directly linked to the power architecture of the WLAN device 100. Sleep-clients 150 may request waking-up of the WLAN device 100 without having any awareness of the availability of the WLAN device 100 to receive data. In some instances, the WLAN chip 100 being powered is not a sufficient condition to guarantee the host interface is available.

For example, if one of the sleep clients, such as sleep client 1 (152), asserts the wake-up pin when the WLAN device 100 is asleep, it takes several clock cycles before the apps core of the WLAN device 100 can begin booting, this can be of the order of 200 clock cycles. Then the apps core will restore the system state, including the state of the host interface.

With a clock frequency of 32 kHz, it can be several milli-seconds before the communication interface 124 is available after the sleep-client has asserted the wake-up pin.

The client wake-up communication interface 124 is configured to interface between sleep clients 150 and the WLAN chipset 100. The interface 124 can provide each sleep client with an indication of the actual availability of the WLAN chipset 100.

The availability of the interface 124 is in practice something that the WLAN chip 100 firmware should determine. When the firmware resets the interface 124, the interface will be unavailable. Resetting the hardware on the chip is not restricted to simply when the sleep clients 150 assert the wake-up pin, it can happen before, during and after the wake-up pin is asserted.

A 'sleep manager' software service can be operated to manage each of the various subsystems that have sleep or clocking requirements. Each subsystem can have a sleep-client registered with the sleep manager service. The service will take the requests from each of the clients and manage the state of the chip 100 and communication interface 124.

Data can be transferred between the WLAN device 100 and any of the sleep clients on a communication bus 158. Each sleep client is capable of communicating with the sleep-client communication interface to check availability of the interface 130, toggle the sleep-client request memory location 128 and receive interrupts from the communication interface 124 when the interface becomes available.

In accordance with embodiments, the interface 124 relies on two memory locations (126, 128) to advertise host interface availability and for the host to signal it no longer requires the host interface. The interface availability can be encoded across two memory locations: chip 126 (this location is owned by the WLAN chip 100 and is toggled when the chip is awake and the sleep-client interface is available); sleep-client request 128 (this location is owned by the sleep-clients 150 and is toggled when the sleep-client no longer requires the interface 124. The sleep-client request memory location 128 is accessible by the sleep-client device even when the electronic device is not available to receive data through the communication interface. For example, this location may be linked to a communication bus which is separate to the main data bus, such as the SDIO bus of the WLAN device 100.

The interface availability is then calculated by performing a logic XOR operation between the chip memory location value(s) 126 and the sleep-client request memory location(s) values 128. The interface availability is encoded in the XOR of the two memory locations and the individual memory locations do not have a specific meaning in isolation. As long as the sleep-client does not modify the value of the dedicated sleep-client memory location, the WLAN chip 100 is not allowed to enter the sleep-mode.

An interrupt module 160 manages interrupt signals that can be sent to any of the sleep clients 150 and/or one or more processor(s) of the WLAN device 100 when one or more values of the memory chip 126 and sleep-client request 128 memory locations are toggled.

Figure 2:
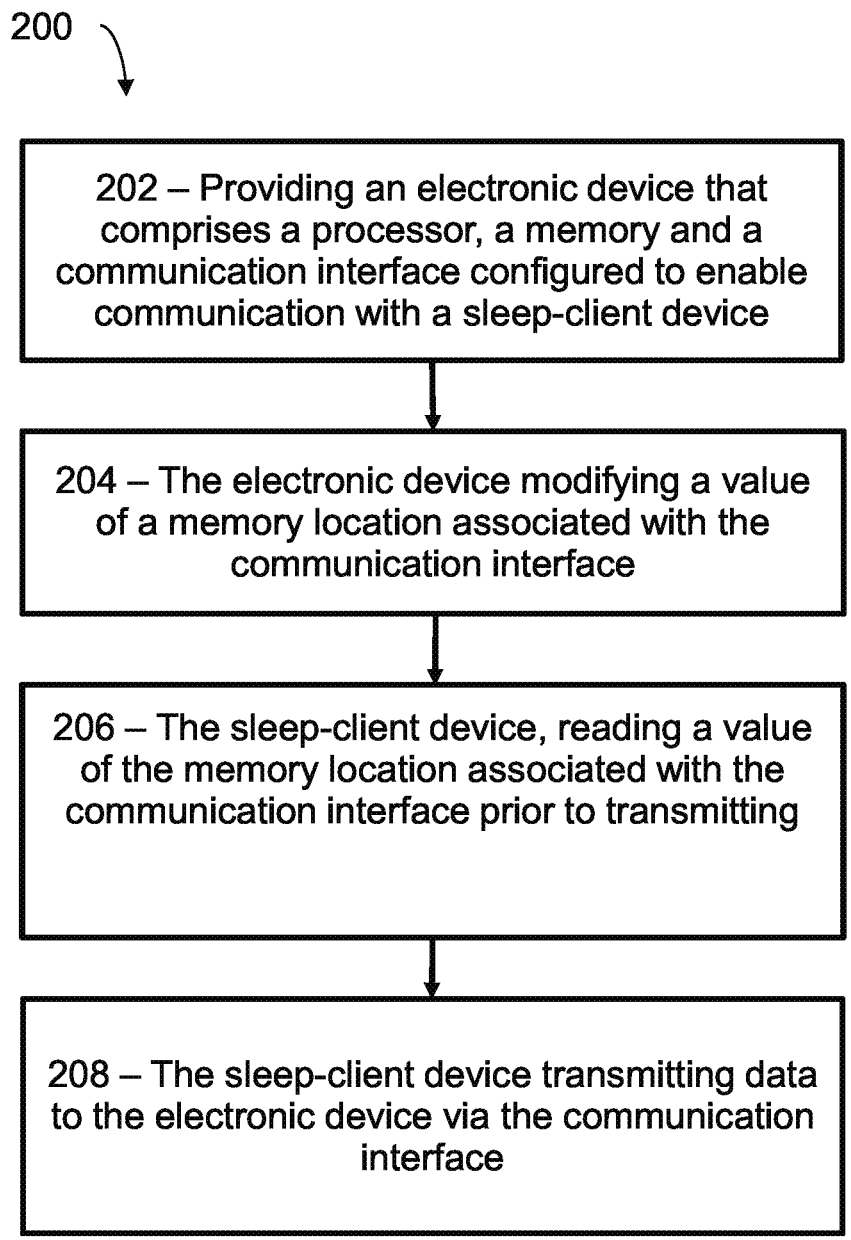
FIG. 2 shows a flow diagram with method steps used to perform a method for managing a sleep-mode of an electronic device in accordance with embodiments.

Referring now to FIG. 2 a flow diagram with method steps used to perform a method for managing a sleep-mode of an electronic device in accordance with embodiments. A device comprising a processor, a memory and a communication interface configured to enable communication with a sleep-client device is provided, 202. The electronic device modifies a value of a memory location associated with the communication interface, 204. The sleep-client device reads a value of the memory location associated with the communication interface prior to transmitting data to the electronic device via the communication interface, 206. The sleep-client device transmitting data to the electronic device via the communication interface.

Figure 3:
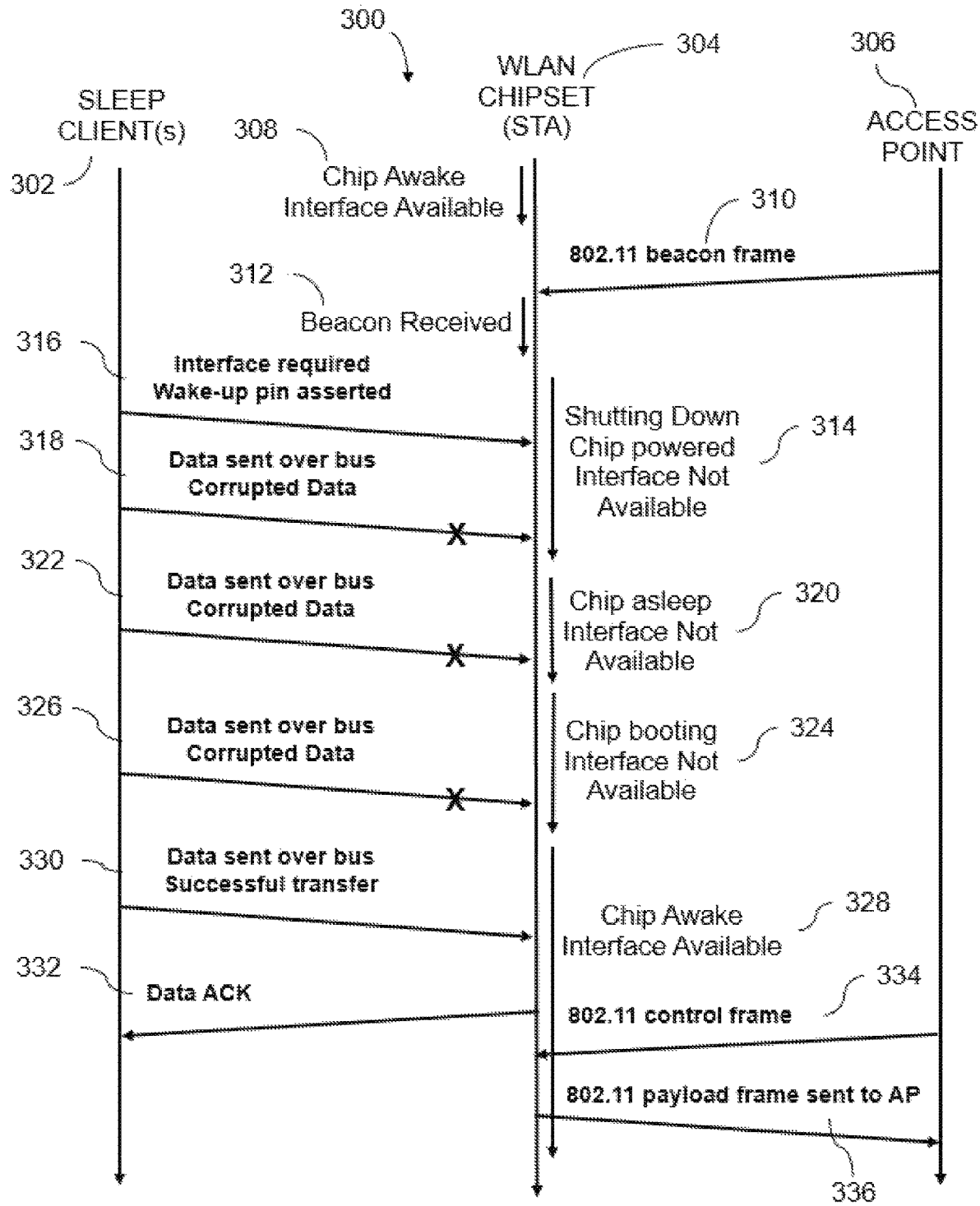
FIG. 3 shows a communication timeline between a sleep-client, a WLAN chip, and an access point in line with the current state of the art.
Figure 4:
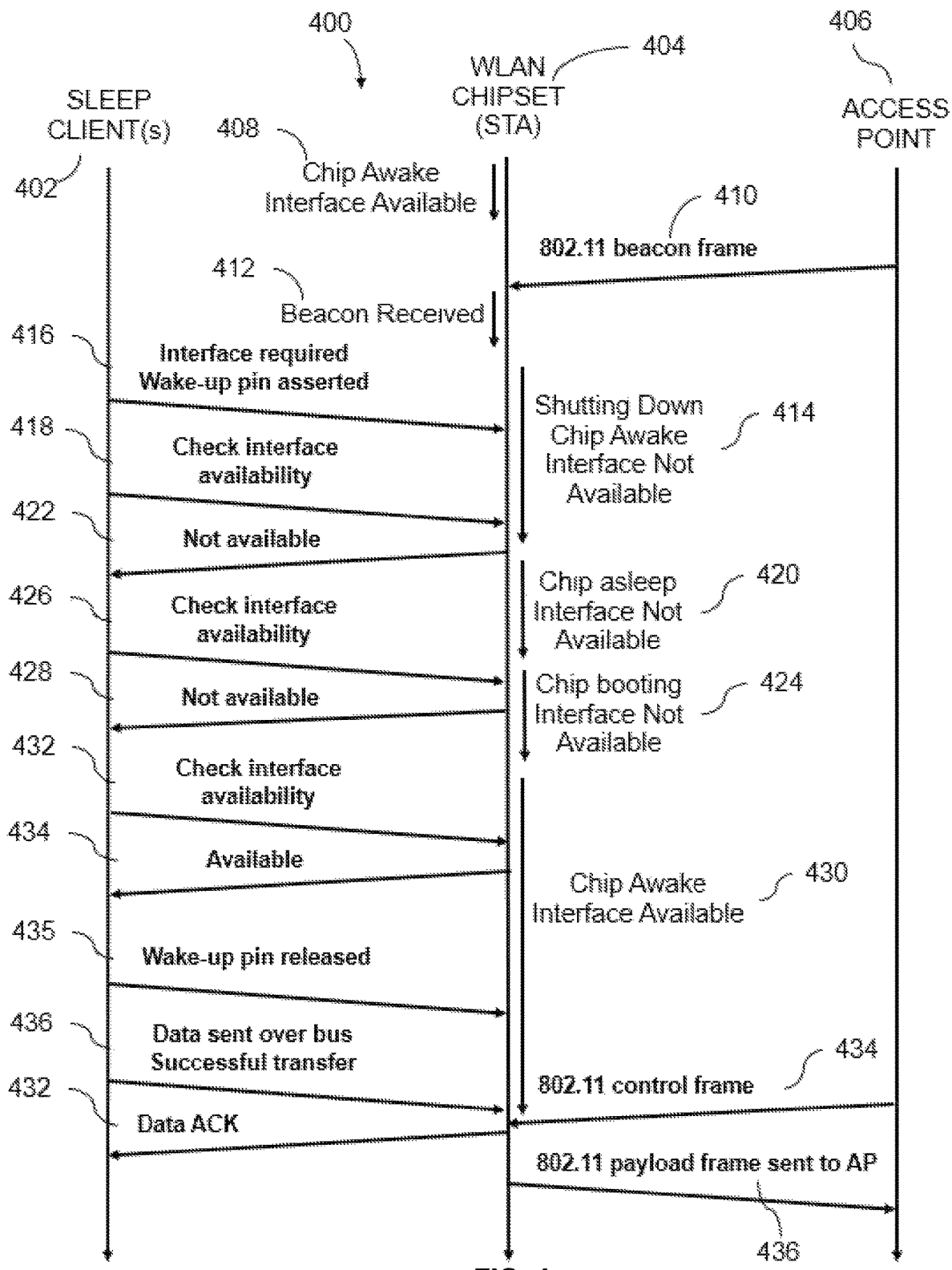
FIG. 4 shows a communication timeline between a sleep-client, a WLAN chip, and an access point in accordance with embodiments.

FIGS. 3 and 4 outline a scenario where the chip is awake to read a Wi-Fi beacon, receives the beacon and is about to go into sleep-mode. At the same time one of the sleep clients attempts to send data across the main bus. FIG. 3 outlines the issues that may arise in this scenario based on current technology. FIG. 4 shows the timeline of events as managed by the sleep module and communication interface of the WLAN device in accordance with embodiments.

The timeline plot 300 of FIG. 3, shows the exchange of messages between a sleep-client 302, the WLAN device 304 and an AP 306. The messages between the sleep-client 302 and the WLAN device 304 are digital or analog signals exchanged across the architecture shown in FIG. 1. The messages between the WLAN device 304 and the AP 306 are exchanged over the WM.

The WLAN device 304 is initially awake and waiting to receive a beacon 308. As the beacon frame 310 is received 312 from the AP 306, the WLAN device 304 begins a shutting down (entering sleep-mode) process 314. For about a thousand clock cycles (about 10 μs for a clock frequency of 120 MHz) the chip 304 is powered but its communication interface is not available, until the chip 304 enters sleep-mode.

Whilst the WLAN device 304 is in the process of entering sleep-mode 314, the sleep-client 302 requests the chip 304 communication interface to transmit data over the communication bus. The sleep-client 302 may have an analog wake-up pin that is asserted when communication with the WLAN chip 304 is required. The wake-up pin is asserted 316 and data is sent over the communication bus 318 shortly after, as the sleep client 302 may assume that the WLAN chip 304 is now powered and ready to receive the data.

In this instance, as the chip 304 was in the process of moving to the sleep-mode 314, the chip is not in a state to receive data from the sleep-client 302 over the internal communication bus and the communication interface is not available. The transmitted data may be lost or corrupted.

Upon detecting the wake-up signal 316, the chip 304 will begin a powering-up process (exiting sleep-mode) 324 in order to begin receiving the data being sent by the sleep client over the communication bus. Once this process is completed the communication interface is made available. The chip requires a timeframe in the order of milliseconds to re-power the hardware and exit sleep-mode. In addition, about a thousand clock cycles (about 10 µs for a clock frequency of 120 MHz) are required for the communication interface to become available after re-powering.

During this period of time, a number of transmissions 322, 326 from the sleep-client 302 to the WLAN chip 304 may take place with consequent corruption or loss of data. If the WLAN chip 304 is still powered when the transmission is sent (318), the bus controller may return an error code to the sleep client 302 as the communication interface is not available.

Once the communication interface is available 328, the WLAN device is capable of receiving data on the communication bus and transmissions from the sleep-client can be completed successfully 330 and acknowledged 332 by the WLAN device 304. Once awake, the WLAN device 304 can also send and receive data to and from the AP 334, 336.

The timeline plot 300 of FIG. 3, shows that the WLAN chip 302 being awake (powered) is not sufficient to guarantee that the sleep-client interface being available, and data being received correctly from the sleep client 302.

The timeline plot 400 of FIG. 4, shows the exchange of messages between a sleep-client 402, the WLAN device 404 and an AP 406 based on a process in accordance with embodiments. The messages between the sleep-client 402 and the WLAN device 404 are digital or analog signals exchanged across the architecture shown in FIG. 1. The messages between the WLAN device 404 and the AP 406 are exchanged over the WM.

The WLAN device 404 is initially awake and waiting to receive a beacon 408. As the beacon frame 410 is received 412 from the AP 406, the WLAN device 404 begins a shutting-down (entering sleep-mode) process 414. For about a thousand clock cycles (about 10 µs for a clock frequency of 120 MHz) the chip 404 is powered but its communication interface is not available, until the chip 404 enters sleep-mode.

Whilst the WLAN device 404 is in the process of entering sleep-mode 414, the sleep-client 402 requests the chip 404 communication interface to transmit data over the communication bus. In this instance, the sleep-client 402 asserts the analog wake-up pin when communication with the WLAN chip 404 is required. In accordance with embodiments, once the wake-up pin is asserted 416, the availability of the communication interface is checked digitally 418. In the architecture 100 of FIG. 1, this is achieved by querying the status of the logic port 130.

Upon detecting the wake-up signal 416, the chip 404 begins a powering-up process (exiting sleep-mode) 424 in order to begin receiving the data being sent by the sleep client 402 over the communication bus. Once this process is completed the communication interface is made available. The chip requires a timeframe in the order of milliseconds to re-power the hardware and exit sleep-mode. In addition, about a thousand clock cycles (about 10 µs for a clock frequency of 120 MHz) are required for the communication interface to become available after re-powering.

During this period of time the sleep-client 402 may check the status of the communication interface one or more times (418, 426, 432) and find that the interface is unavailable (422, 428), therefore the WLAN device 404 is not capable of receiving the data in the communication bus.

Any attempts to read/write one the dedicated sleep-client memory locations or communication interface availability may return different communication errors from the bus controller if the WLAN chip 404 is still powered and entering sleep-mode, or fully powered-down.

In some embodiments of the invention, a sub portion of the WLAN chip memory including the sleep management memory locations may be maintained powered to avoid incurring read/write errors in the sleep management process.

When the communication interface is found to be available 434, the wake-up pin is released 435 and data is sent over the communication bus 436 and acknowledged 432 by the WLAN device 404.

Being able to advertise the availability of the communication interface at a software level, allows avoiding transmission of data to the WLAN chip when the chip is in a state that does not allow receiving such data correctly.

In some embodiments, it is unnecessary for the sleep-client 402 to check the availability of the interface multiple times (418, 426, 432). The firmware managing the communication interface may generate software interrupts, such as SDIO interrupts, for the sleep-client 402 when the chip memory location 126 is toggled, and for the WLAN device 100 when the sleep-client memory location 128 is toggled. The interrupts can prompt the sleep-client 402 to check the status of the interface.

FIG. 5 shows a signal chart 500 that schematically represents the signal transitions on the wake-up pin, the sleep-client memory location, the communication bus, the chip memory location, the interface availability signal (XOR), the WLAN device power status, and the incoming traffic from the AP.

Initially, the chip is awake and ready to receive data across the data communication bus or WM via the radio. A beacon is received during this time from the AP, 502. Whilst the chip is still fully powered, one of the sleep-clients raises a wake-up analog signal to request availability of the communication interface, 504. However, at this point, the chip software begins to perform a routine process to take the chip into sleep-mode to save power, 506. For a number of clock cycles, the chip continues going through the sleep-mode process. The request for the interface forwarded by the sleep-client through the wake-up signal is detected and the chip immediately begins powering-up again, 508. The first shaded area 526 in FIG. 5 represents the time period between the requirement from the sleep-client to communicate with the chip and the chip being fully re-powered. In order for the chip to be able to receive data from a sleep-client, the communication interface needs to become available again and this may take several clock cycles after the full power is restored, these cycles are shown in the second shaded area 528 of FIG. 5. Between the wake-up signal request (504) and the new availability of the communication interface (510), the chip is not in a state suitable to receive data over the communication bus.

Once the chip reaches such a state, several clock cycles after the full power is restored, the chip memory location is toggled. The logic XOR between the chip memory location and the sleep client memory location (which has not yet been modified throughout the process) also toggles, flagging the availability of the communication interface. A SDIO interrupt may be sent to the sleep-client that raised the wake-up signal request to flag interface availability.

At this stage, the request for the interface from the sleep-client can be dropped by dropping the wake-up analog signal, 512. At the same time, data can be transmitted from the sleep-client to the chip over the communication bus, 514. Once the data transmission is completed 516, the sleep-client toggles its associated memory location 518. At the same time, the interface becomes unavailable 520, as the XOR output toggles and the chip can move back to the sleep-mode 524. The third shaded area 530 of FIG. 5 shows the time period of availability of the communication interface.

In some embodiments, each sleep-client can signal its minimum clocking requirements to the WLAN chip. The selected clock speed may determine how much computing power and memory resources should be made available for the sleep-client requesting wake-up. If multiple requests are made by multiple sleep-clients, the chip clock can be set at the highest speed requested.

In some embodiments, there is more than one sleep-client for the single WLAN chip, and the WLAN chip is only allowed to go into sleep-mode when all the sleep-clients have released their sleep veto by toggling the sleep client memory location.

In other embodiments, a simplified version of the system may be adopted. In such a version only a single memory location is associated with the communication interface. The WLAN chip modifies the value of the memory location to advertise availability of the communication interface. When the interface is made available, the sleep-client(s) can transmit data to the WLAN device. A sleep-client can modify the value of the memory location to give permission to the WLAN device to go into a sleep-mode. The WLAN device is not allowed to enter sleep-mode unless the memory location is toggled by a sleep-client.

The terms WLAN chip, WLAN device and, in some instances, electronic device have been used interchangeably in this specification.

Although the invention has been described in terms of devices and methods for managing a sleep mode between a WLAN chipset and one or more sleep-clients, it is contemplated that one or more products may be implemented in other forms of chipsets that require a sleep mode. In these embodiments, one or more of the functions of the various components may be implemented in software that controls a general-purpose computer. This software may be embodied in a non-transitory computer readable medium, for example, RAM, a magnetic or optical disk or a memory-card.

Although the invention is illustrated and described herein with reference to specific embodiments, the invention is not intended to be limited to the details shown. Rather, various modifications may be made in the details within the scope and range of equivalents of the claims and without departing from the invention.

It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

Throughout this specification, unless the context clearly requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles, or the like which has been included in the present specification is solely for the purpose of providing a context for the present technology. It is not to be taken as an admission that any or all these matters form part of the prior art base or were common general knowledge in the field relevant to the present technology as it existed before the priority date of each claim of this specification.

What is claimed is:

1. A method for managing a sleep-mode of an electronic device that comprises a processor, a memory and a communication interface configured to enable communication with a sleep-client device; the electronic device being arranged to enter the sleep-mode in predetermined circumstances to reduce power consumption; the method comprising the steps of:
   the electronic device modifying a value of a first location of the memory to advertise availability of the communication interface; and
   the sleep-client device modifying a value of a second location of the memory based on a requirement of the communication interface from the sleep-client device;
   wherein the availability of the electronic device to receive data via the communication interface is encoded in a combination of the values at the first and second memory locations.

2. The method of claim 1, wherein the method further comprises the step of sending an interrupt signal to the electronic device upon writing of the second memory location or sending an interrupt signal to a sleep-client device upon writing of the first memory location.

3. The method of claim 1, wherein the first and second memory locations are memory bits, and the combination of the locations is an XOR logic operation.

4. The method of claim 1, wherein the method further comprises the step of the sleep-client device sending a wake request signal to request availability of the communication interface.

5. The method of claim 1, wherein upon confirmation of availability of the communication interface, the sleep-client sends a minimum clocking requirements request to the electronic device.

6. A wireless communication device comprising:
   a radio frequency (RF) module arranged to receive and transmit radio frequency signals;

an analog-to-digital (ADC) converter and digital filters;
a processor;
an electronic device;
a sleep-client-device;
a communication interface configured to enable communication with the electronic device and the sleep-client device; and
a first and a second memory locations associated with the communication interface, wherein the first memory location being accessible from the electronic device and a value of the first memory location advertises availability of the communication interface, and the second memory location being accessible by the sleep-client device and a value of the second memory location advertises a requirement of the communication interface from the sleep-client device;
wherein the availability of the electronic device to receive data via the communication interface is encoded in a combination of the values at the first and second memory locations.

7. The wireless communication device of claim 6, further comprising a wake pin arranged to receive an analog wake-up signal from the sleep-client device, the wake-up signal representing a request to wake-up.

8. The wireless communication device of claim 6, wherein the second memory location is accessible by the sleep-client device even when the electronic device is not available to receive data through the communication interface.

9. The wireless communication device of claim 6, further comprising an interrupt module operatively coupled with the processor and the sleep-client device, for sending an interrupt signal to the electronic device or the sleep-client device when the combination of values at the first and second memory locations has been changed.

10. The wireless communication device of claim 6, further comprising an interrupt module operatively coupled with the processor and the sleep-client device, for sending an interrupt signal to the electronic device upon writing of the second memory location or sending an interrupt signal to the sleep-client device upon writing of the first memory location.

11. The wireless communication device of claim 10, wherein the first and second memory locations are memory bits, and the combination of the locations is an XOR logic operation.

* * * * *